United States Patent
Meng et al.

(10) Patent No.: US 10,914,966 B2
(45) Date of Patent: Feb. 9, 2021

(54) DISPLAY DEVICE, LIQUID CRYSTAL DISPLAY GRATING AND MANUFACTURING METHOD

(71) Applicant: Shenzhen China Star Optoelectronics Technology Co., Ltd., Guangdong (CN)

(72) Inventors: Yanhong Meng, Guangdong (CN); Zhixiong Jiang, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 217 days.

(21) Appl. No.: 15/533,012

(22) PCT Filed: Apr. 25, 2017

(86) PCT No.: PCT/CN2017/081777
§ 371 (c)(1),
(2) Date: Jun. 3, 2017

(87) PCT Pub. No.: WO2018/176539
PCT Pub. Date: Oct. 4, 2018

(65) Prior Publication Data
US 2019/0086678 A1   Mar. 21, 2019

(30) Foreign Application Priority Data
Mar. 31, 2017   (CN) .......................... 2017 1 0208855

(51) Int. Cl.
*G02B 30/27* (2020.01)
*G02F 1/1337* (2006.01)
(Continued)

(52) U.S. Cl.
CPC ............ *G02B 30/27* (2020.01); *G02B 30/25* (2020.01); *G02F 1/1313* (2013.01);
(Continued)

(58) Field of Classification Search
CPC .... G02B 27/2214; G02B 27/22; G02B 30/27; G02B 30/25; H04N 13/04; G02F 1/1313; G02F 1/133528; G02F 1/133711
See application file for complete search history.

(56) References Cited

U.S. PATENT DOCUMENTS 7,808,564 B2   10/2010   Tamura et al.
2009/0009703 A1 *  1/2009   Tamaki ............ G02F 1/133788
                                                  349/123
(Continued)

FOREIGN PATENT DOCUMENTS

CN   101196615 A   6/2008
CN   201765385 U   3/2011
CN   105874360 A   8/2016

*Primary Examiner* — Michael H Caley
*Assistant Examiner* — Agnes Dobrowolski
(74) *Attorney, Agent, or Firm* — Leong C. Lei

(57) ABSTRACT

The disclosure discloses a manufacturing method of a liquid crystal display grating. The method includes preparing a substrate, depositing a transparent film layer on the substrate, patterning the transparent film layer for producing a plurality of containing grooves, depositing a liquid crystal alignment film in the containing grooves, injecting liquid crystal molecules in the containing grooves, aligning and packaging the liquid crystal molecules. The disclosure can achieve 3D display by the method above.

20 Claims, 3 Drawing Sheets

(51) Int. Cl.
*G02F 1/1335* (2006.01)
*G02F 1/13* (2006.01)
*G02B 30/25* (2020.01)

(52) U.S. Cl.
CPC .. *G02F 1/133528* (2013.01); *G02F 1/133711* (2013.01); *G02F 1/133723* (2013.01); *G02F 2001/133538* (2013.01); *G02F 2001/133562* (2013.01); *G02F 2201/30* (2013.01)

(56) References Cited

U.S. PATENT DOCUMENTS

| | | | |
|---|---|---|---|
| 2010/0260030 A1* | 10/2010 | Tao | G02B 5/1828 369/112.02 |
| 2010/0265435 A1* | 10/2010 | Hwang | G02F 1/1323 349/64 |
| 2013/0010229 A1* | 1/2013 | Shin | G02F 1/133617 349/62 |
| 2013/0114136 A1 | 5/2013 | Saito et al. | |
| 2013/0321734 A1* | 12/2013 | Won | G02F 1/136286 349/43 |
| 2014/0049738 A1 | 2/2014 | Hirai | |

* cited by examiner

DISPLAY DEVICE, LIQUID CRYSTAL DISPLAY GRATING AND MANUFACTURING METHOD

FIELD OF THE DISCLOSURE

The disclosure relates to a display technical field, and more particularly to a display device, a liquid crystal display grating and a manufacturing method.

BACKGROUND 3D in the 3D display technology indicates the three-dimensional space. Compared with displaying a common 2D image, the 3D technology can make the image stereoscopic and vivid. The image is no longer restricted to the screen, which can seem to extend out of the screen and make audiences to have the immersed sense. The 3D display technology is classified into various sorts, basic principles of which are similar, which are forming an image with a three-dimensional effect of front-rear, top-bottom, left-right and far-near by receiving different images via left and right eyes after overlapping and reforming the image information by the brain.

An active shutter 3D achieves the 3D effect by improving the refresh rate of an image. The image is divided into two according to frames to form two groups of images corresponding to the left eye and the right eye for continuously linked display. At the same time an infrared signal transmitter controls switches of left and right lenses of the shutter 3D glasses synchronously to make the left and right eyes to see the corresponding image at the correct time. But after utilization for a long time, it can easily cause eyestrain and even dizziness. The assorted active shutter 3D glasses are relatively pricy and heavy with the requirement of charging.

SUMMARY

The disclosure provides a display device, a liquid crystal display grating and a manufacturing method, which can achieve 3D display with the assistance of polarized 3D glasses.

In order to solve the technical problem above, the disclosure provides a display device. The display device includes a liquid crystal display grating and a liquid crystal display panel. The liquid crystal display grating and a visible region of the liquid crystal display panel are disposed correspondingly. The liquid crystal display grating includes a substrate, a transparent film layer disposed on the substrate, a liquid crystal alignment film, liquid crystal molecules, and a packaging substrate disposed opposite to the substrate. The transparent film layer includes a plurality of containing grooves. The containing grooves are configured to store the liquid crystal molecules. The liquid crystal alignment film is deposited in the containing grooves. The liquid crystal molecules are stored in the containing grooves. The packaging substrate is configured to package the liquid crystal molecules. The transparent film layer at least includes one of silicon nitride, silicon oxide and negative photoresist. The liquid crystal alignment film is any one of polystyrene and derivatives thereof, polyvinyl alcohol, polyester, epoxy resin, polyurethane, polysilane and polyimide.

In order to solve the technical problem above, the disclosure further provides a manufacturing method of a liquid crystal display grating. The method includes preparing a substrate, depositing a transparent film layer on the substrate, patterning the transparent film layer for producing a plurality of containing grooves, depositing a liquid crystal alignment film in the containing grooves, injecting liquid crystal molecules in the containing grooves, and aligning and packaging the liquid crystal molecules.

In order to solve the technical problem above, the disclosure further provides a liquid crystal display grating. The liquid crystal display grating includes a substrate, a transparent film layer disposed on the substrate, a liquid crystal alignment film, liquid crystal molecules, and a packaging substrate disposed opposite to the substrate. The transparent film layer includes a plurality of containing grooves. The containing grooves are configured to store the liquid crystal molecules. The liquid crystal alignment film is deposited in the containing grooves. The liquid crystal molecules are stored in the containing grooves. The packaging substrate is configured to package the liquid crystal molecules.

In order to solve the technical problem above, the disclosure further provides a display device. The display device includes the liquid crystal display grating and the liquid crystal display panel described above. The liquid crystal display grating and a visible region of the liquid crystal display panel are disposed correspondingly.

The disclosure provides a display device, a liquid crystal display grating and a manufacturing method. The liquid crystal in the containing grooves of the liquid crystal display grating can change the polarization state of rays. The liquid crystal display grating is manufactured and disposed in front of the liquid crystal display panel, and the 3D display can be achieved by cooperating with polarized 3D glasses.

DETAILED DESCRIPTION OF PREFERRED EMBODIMENTS

Embodiments of the disclosure will be described in detail with reference to the accompanying drawings as follows. Obviously, the described embodiments are part of embodiments of the disclosure rather than all of them. Based on the embodiments of the disclosure, all other embodiments obtained by a person skilled in the art without creativity should be considered within the scope of protection of the disclosure.

Figure 1:
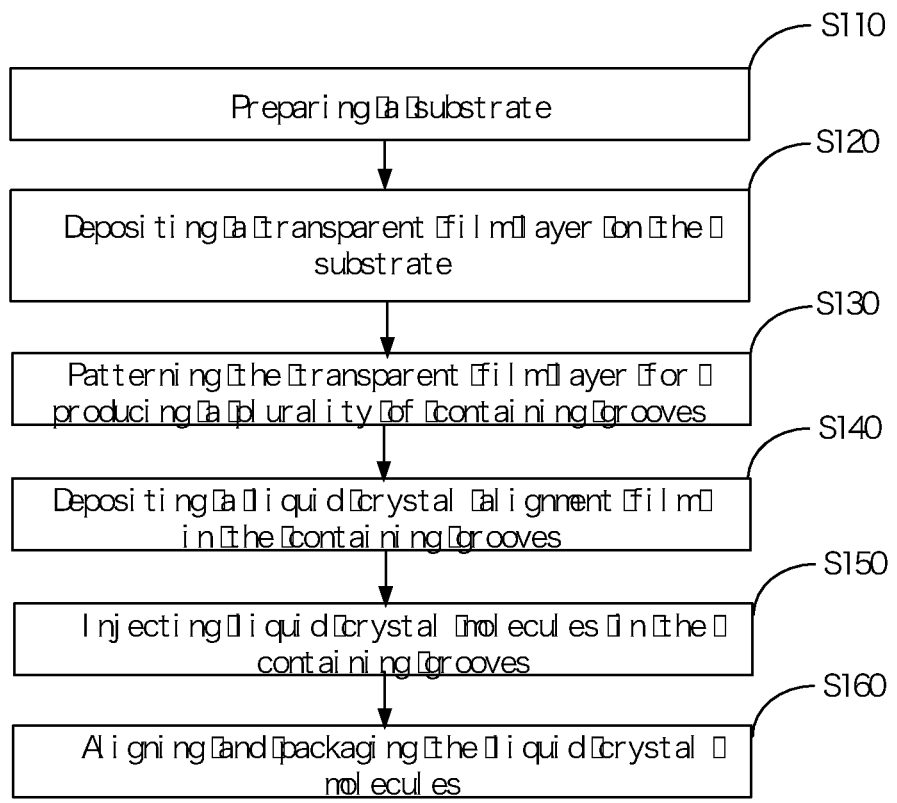
FIG. 1 is a schematic flowchart of a manufacturing method of a liquid crystal display grating according to an embodiment of the disclosure.

Referring to FIG. 1, FIG. 1 is a schematic flowchart of a manufacturing method of a liquid crystal display grating according to an embodiment of the disclosure.

S110, preparing a substrate.

The substrate can be transparent, which can specifically be glass or transparent plastic.

S120, depositing a transparent film layer on the substrate.

The transparent film layer can be an inorganic compound, such as silicon nitride (SiNx), silicon oxide ($SiO_2$), etc. In other embodiments, it can also be an organic compound, such as negative photoresist, which specifically can be SU-8. A thickness of the transparent film layer can be 40 nm~4000 nm.

S130, patterning the transparent film layer for producing a plurality of containing grooves.

In step S130, the transparent film layer above is patterned by photoetching. The photoetching indicates a process of removing a certain section of the transparent film layer on the surface of the substrate by a series of producing steps and leaving the transparent film layer with a patterned structure on the substrate. The transparent film layer with the containing groove structure is finally remained on the surface of the substrate after the photoetching process. Three basic elements of photoetching are controlling illumination (mainly ultraviolet light), masks and photoresist. In the embodiment, the plurality of containing grooves configured to store liquid crystal molecules are produced on the transparent film layer by photoetching.

S140, depositing a liquid crystal alignment film in the containing grooves.

The alignment film indicates a polymeric film that can drive liquid crystal molecules to move directionally. Polymeric materials used as the liquid crystal molecule alignment film include polystyrene (PS) and derivatives thereof, polyvinyl alcohol (PVA), polyester (PE), epoxy resin (ER), polyurethane (PU), polysilane and polyimide (PI). In the embodiment, the alignment film of liquid crystal molecules adopting PI is deposited in the containing grooves above for pre-alignment of the liquid crystal molecules. PI indicates a sort of polymer whose main chain containing an imide ring, which can satisfy requirements of the industry on physical properties of the alignment layer material due to excellent characteristics such as thermal stability, chemical stability, high temperature resistance around 350-450 degrees, superior insulation, dielectric, mechanics, film-formation features, and low costs in manufacture. The PI film layer inherently has the function of aligning liquid crystal molecules, which shows good alignment effects on all liquid crystal materials.

S150, injecting liquid crystal molecules in the containing grooves.

S160, aligning and packaging the liquid crystal molecules.

The alignment technology of liquid crystal molecules can achieve the orderly arrangement of liquid crystal molecules on the entire surface of the substrate with the optimum angle and sufficient stability. Only this can the liquid crystal molecules show the long range order macroscopically, which means the alignment technology of liquid crystal molecules is a necessary condition for proper operation of liquid crystal devices. The alignment technology of liquid crystal molecules relates to properties of alignment film materials, processing methods of alignment film layer surfaces, and interaction on the interface, which is a comprehensive process. The alignment technology adopted by the industry has two categories. One is a conventional friction alignment technique, the other is a non-friction alignment technique.

The friction alignment technique indicates rubbing the alignment film of liquid crystal molecules by materials such as nylon, fiber or cotton linter to change the state of the surface of the film layer, which generates a uniform anchoring effect on liquid crystal molecules, so that the liquid crystal molecules show uniform and coincident arrangement within a region at a certain pre-tilt angle. The essence of the friction alignment is causing anisotropy on the surface of the alignment film by friction. And the liquid crystal molecules and alignment film molecules interact on the surface. As forces on each direction are different, in order to achieve a stable state of minimum energy, liquid crystal molecules will be arranged along a direction of the maximum force.

The non-friction alignment technique mainly has the optically controlled alignment technique, the oblique evaporation method, the LB film technique, etc. The optically controlled alignment technique is aligning liquid crystal molecules via anisotropy generated by the photochemical reaction of UV photosensitive polymer monomer materials. The oblique evaporation method is a process of evaporating inorganic materials such as metal, oxide, fluoride, etc. along a direction at some angle with a normal line of the substrate. The LB film technique indicates insoluble monomolecular layers can be transferred to the substrate by a certain method under proper conditions and basically retain the aligned molecular layer structure.

The two sorts of techniques each have advantages and disadvantages, as well as respective application fields. Different liquid crystal molecule substrate production lines can adopt various techniques. In the embodiment, the friction alignment technique and the non-friction alignment technique both are adoptable, which will not be limited by the disclosure. The liquid crystal molecules are aligned and packaged.

Figure 2:
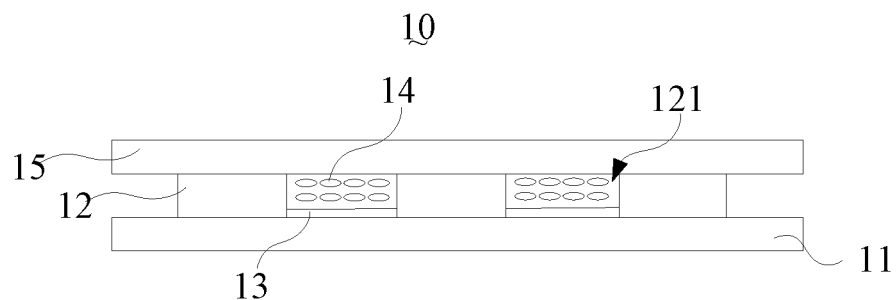
FIG. 2 is a structural schematic view of a liquid crystal display grating according to an embodiment of the disclosure.

Referring to FIG. 2, FIG. 2 is a structural schematic view of a liquid crystal display grating according to an embodiment of the disclosure. As shown in FIG. 2, the liquid crystal display grating 10 includes a substrate 11, a transparent film layer 12, a liquid crystal alignment film 13, liquid crystal molecules 14 and a packaging substrate 15.

The substrate 11 can be the transparent material, which specifically can be glass or transparent plastic.

The transparent film layer 12 deposited on the substrate 11 includes a plurality of containing grooves 121. The containing grooves 121 are configured to store the liquid crystal molecules 14. The transparent film layer 12 can be an inorganic compound, such as silicon nitride (SiNx), silicon oxide ($SiO_2$), etc. In other embodiments, it can also be an organic compound, such as negative photoresist, which specifically can be SU-8. A thickness of the transparent film layer 12 can be 40 nm~4000 nm.

The liquid crystal alignment film 13 is deposited in the containing grooves 121. The liquid crystal alignment film 13 indicates a polymeric film that can drive liquid crystal molecules to move directionally. Polymeric materials used as the liquid crystal molecule alignment film include polystyrene (PS) and derivatives thereof, polyvinyl alcohol (PVA), polyester (PE), epoxy resin (ER), polyurethane (PU), polysilane and polyimide (PI). In the embodiment, the alignment film of liquid crystal molecules adopting PI is deposited in the containing grooves 121 above for pre-alignment of the liquid crystal molecules 14. PI indicates a sort of polymer whose main chain containing an imide ring, which can satisfy requirements of the industry on physical properties of the alignment layer material due to excellent characteristics such as thermal stability, chemical stability, high temperature resistance around 350-450 degrees, superior insulation, dielectric, mechanics, film-formation features, and low costs in manufacture. The PI film layer inherently has the function of aligning liquid crystal molecules, which shows good alignment effects on all liquid crystal materials.

The liquid crystal molecules 14 are stored in the containing grooves 121.

The packaging substrate 15 disposed opposite to the substrate 11 is configured to package the liquid crystal molecules 14. The packaging substrate 15 can be the transparent material, which specifically can be glass or transparent plastic.

Figure 3:
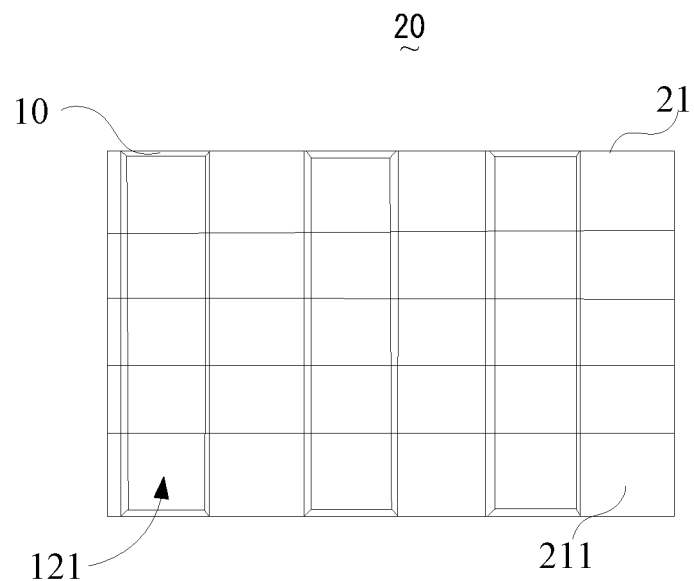
FIG. 3 is a structural schematic view of a display device according to an embodiment of the disclosure.

Referring to FIG. 3, FIG. 3 is a structural schematic view of a display device according to an embodiment of the disclosure. As shown in the figure, the display device 20 includes the liquid crystal display grating 10 in any embodiment described above, and a liquid crystal display panel 21. The liquid crystal display grating 10 and a visible region of the liquid crystal display panel 21 are disposed correspondingly.

The visible region of the liquid crystal display panel 21 includes a plurality of pixels 211 arranged as an array. Each of the containing grooves 121 and at least one row of the pixels 211 are corresponding, and each of the pixels 211 at least includes red, green and blue three subpixels, and at least one row of the pixels 211 are disposed between every two adjacent containing grooves 121. The length and wide of the containing grooves 121 are identical to the length and width of the row of pixels 211. Specifically, the liquid crystal display grating 10 modifies the polarization state of emitting light through the liquid crystal display panel 21 by a manner of disposition on every other rows.

Figure 4:
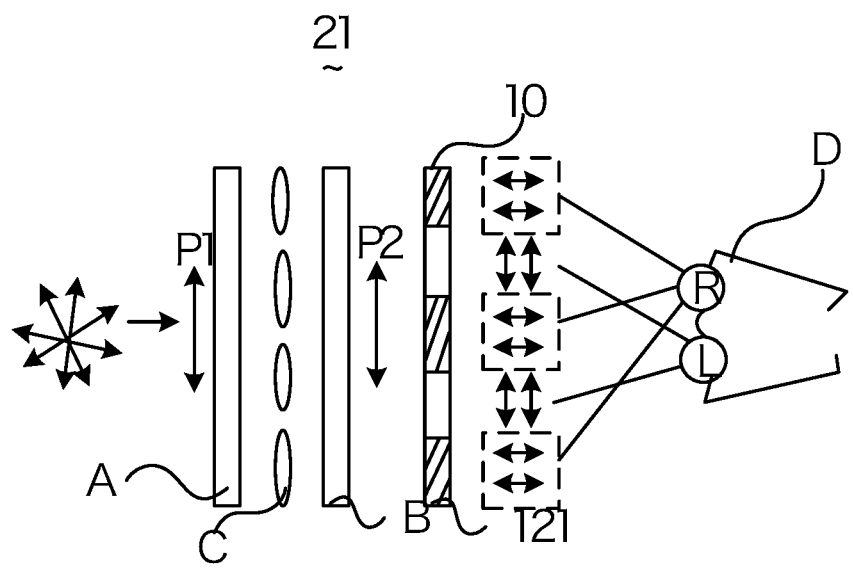
FIG. 4 is an operational principal schematic view of a display panel according to an embodiment of the disclosure.

Simply speaking, referring to FIG. 4, FIG. 4 is an operational principal schematic view of a display panel according to an embodiment of the disclosure. The liquid crystal display panel 21 includes two substrates A and B, liquid crystal molecules C between the two substrates and polaroid disposed on surfaces of the two substrates A and B away from the liquid crystal molecules C (polarizer P1 and analyzer P2). The polarizer P1 can transform white light emitted from the backlight source into linearly polarized light. In a specific embodiment, white rays through the polarizer P1 is transformed into polarized light parallel to the direction of the display panel. Only light satisfying the polarization direction of the analyzer P2 can be emitted after entering the liquid crystal molecules C, which is the parallel polarized light in the direction of the display panel. It needs to be explained that parallel and vertical in the embodiment are merely relative, which are not the specific limitation. In other embodiments of the disclosure, the analyzer P2 and the polarizer P1 can be disposed orthogonally. When the analyzer P2 and the polarizer P1 are disposed orthogonally, the polarization direction of the emitting light through the liquid crystal molecules C should be perpendicular to the direction of the display panel. Back to FIG. 4, the parallel polarized light satisfying the direction of the analyzer P2 enters the liquid crystal display grating 10 after being emitted. It can be known from the figure that light emitted from the row of pixels disposed correspondingly to the containing grooves 121 in the display panel is transformed from the originally parallel polarized light into vertically polarized light, and the row of pixels that are not disposed correspondingly to the containing grooves 121 maintain the original polarization state, which is the parallel polarized light. The left lens of the polarized 3D glasses D is parallel polarized light, and the right lens is vertically polarized light, so that the left eye receives the parallel polarized light emitted from the row of pixels that are not disposed correspondingly to the containing grooves 121, and the right eye receives the vertically polarized light emitted from the row of pixels disposed correspondingly to the containing grooves 121. 3D display is achieved by displaying left eye images on the row of pixels that are not disposed correspondingly to the containing grooves 121 and displaying right eye images on the row of pixels disposed correspondingly to the containing grooves 121. It obviously can be that the left lens of the polarized 3D glasses D is vertically polarized light, and the right lens is parallel polarized light. The row of pixels that are not disposed correspondingly to the containing grooves 121 display the right eye images, and the row of pixels disposed correspondingly to the containing grooves 121 display the left eye images.

Figure 5:
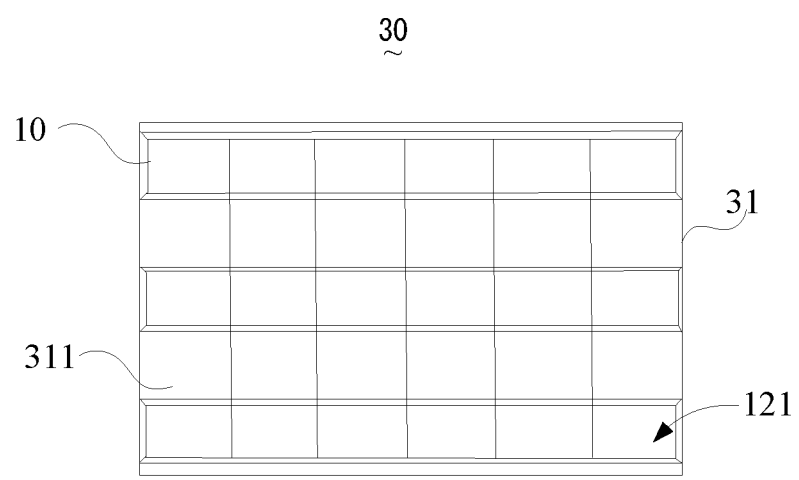
FIG. 5 is a structural schematic view of a display device according to another embodiment of the disclosure.

Referring to FIG. 5, FIG. 5 is a structural schematic view of a display device according to another embodiment of the disclosure. As shown in the figure, the display device 30 includes the liquid crystal display grating 10 in any embodiment described above, and a liquid crystal display panel 31. The liquid crystal display grating 10 and a visible region of the liquid crystal display panel 31 are disposed correspondingly.

The visible region of the liquid crystal display panel 31 includes a plurality of pixels 311 arranged as an array. Each of the containing grooves 121 and at least one column of the pixels 311 are corresponding, and at least one column of the pixels 311 are disposed between every two adjacent containing grooves 121, and each of the pixels 311 at least includes red, green and blue three subpixels. The length and wide of the containing grooves 121 are identical to the length and width of the column of pixels 311. Specifically, the liquid crystal display grating 10 modifies the polarization state of emitting light through the liquid crystal display panel 31 by a manner of disposition on every other columns. The specific operational principle can be referred to the description above, which will not be repeated.

In the embodiments above, the liquid crystal display grating above is disposed on the pixels of the visible region of the display panel on every other rows/columns to alter the polarization state of the light emitted from the liquid crystal display panel, and the 3D display can be achieved with the assistance of the polarized 3D glasses.

In conclusion, it can be easily understood by a person skilled in the art that the disclosure provides a display device, a liquid crystal display grating and a manufacturing method. The liquid crystal display grating above is disposed on the pixels of the visible region of the display panel on every other rows/columns to alter the polarization state of the light emitted from the liquid crystal display panel, and the 3D display can be achieved with the assistance of the polarized 3D glasses.

The description above is merely preferred embodiments of the disclosure, which cannot limit the protection scope of the disclosure. Any equivalent structure or process according to the disclosure directly or indirectly applied in other related fields should be included in the protected scope of the disclosure.

What is claimed is:

1. A display device, comprising a liquid crystal display grating and a liquid crystal display panel, the liquid crystal display grating and a visible region of the liquid crystal display panel disposed correspondingly;

the liquid crystal display grating comprising:
a substrate;
a transparent film layer, deposited on the substrate, the transparent film layer comprising a plurality of containing grooves and a plurality of islands arranged alternately; the containing grooves configured to store liquid crystal molecules;
a liquid crystal alignment film, the liquid crystal alignment film deposited in the containing grooves;
the liquid crystal molecules, the liquid crystal molecules stored in the containing grooves;
a packaging substrate, disposed opposite to the substrate, configured to package the liquid crystal molecules;

the transparent film layer at least comprising one of silicon nitride, silicon oxide and negative photoresist;
the liquid crystal alignment film being any one of polystyrene and derivatives thereof, polyvinyl alcohol, polyester, epoxy resin, polyurethane, polysilane and polyimide;
wherein the transparent film layer directly contacts the substrate, and the packaging substrate directly contacts the transparent film layer;
wherein the plurality of islands directly contacts the substrate and the packaging substrate;
wherein polarized light has a first polarization direction; when the polarized light passes through the plurality of islands, polarization direction of the polarized light does not be changed in the plurality of islands and is still the first polarization direction; and when the polarized light passes through the liquid crystal molecules stored in the containing grooves, the polarization direction of the polarized light is transformed in the liquid crystal molecules into a second polarization direction perpendicular to the first polarization direction.

2. The display device according to claim 1, wherein a thickness of the transparent film layer is 40 nm~4000 nm.

3. The display device according to claim 1, wherein the visible region of the liquid crystal display panel comprises a plurality of pixels arranged as an array, each of the containing grooves and at least a row/a column of the pixels are corresponding, and at least one row/one column of the pixels are disposed between every two adjacent containing grooves.

4. A manufacturing method of a liquid crystal display grating, the method comprising:
preparing a substrate;
depositing a transparent film layer on the substrate;
patterning the transparent film layer for producing a plurality of containing grooves;
depositing a liquid crystal alignment film in the containing grooves;
injecting liquid crystal molecules in the containing grooves;
aligning and packaging the liquid crystal molecules by a packaging substrate;
wherein the transparent film layer directly contacts the substrate, and the packaging substrate directly contacts the transparent film layer;
wherein polarized light has a first polarization direction; when the polarized light passes through the transparent film layer, polarization direction of the polarized light does not be changed in the transparent film layer and is still the first polarization direction; and when the polarized light passes through the liquid crystal molecules stored in the containing grooves, the polarization direction of the polarized light is transformed in the liquid crystal molecules into a second polarization direction perpendicular to the first polarization direction.

5. The manufacturing method according to claim 4, wherein the transparent film layer at least comprises one of silicon nitride, silicon oxide and negative photoresist.

6. The manufacturing method according to claim 5, wherein a thickness of the transparent film layer is 40 nm~4000 nm.

7. The manufacturing method according to claim 4, wherein the liquid crystal alignment film is any one of polystyrene and derivatives thereof, polyvinyl alcohol, polyester, epoxy resin, polyurethane, polysilane and polyimide.

8. A liquid crystal display grating, comprising:
a substrate;
a transparent film layer, deposited on the substrate, the transparent film layer comprising a plurality of containing grooves, the containing grooves configured to store liquid crystal molecules;
a liquid crystal alignment film, the liquid crystal alignment film deposited in the containing grooves;
the liquid crystal molecules, the liquid crystal molecules stored in the containing grooves;
a packaging substrate, disposed opposite to the substrate, configured to package the liquid crystal molecules;
wherein the transparent film layer directly contacts the substrate, and the packaging substrate directly contacts the transparent film layer;
wherein polarized light has a first polarization direction; when the polarized light passes through the transparent film layer, polarization direction of the polarized light does not be changed in the transparent film layer and is still the first polarization direction; and when the polarized light passes through the liquid crystal molecules stored in the containing grooves, the polarization direction of the polarized light is transformed in the liquid crystal molecules into a second polarization direction perpendicular to the first polarization direction.

9. The liquid crystal display grating according to claim 8, wherein the transparent film layer at least comprises one of silicon nitride, silicon oxide and negative photoresist.

10. The liquid crystal display grating according to claim 9, wherein a thickness of the transparent film layer is 40 nm~4000 nm.

11. The liquid crystal display grating according to claim 8, wherein the liquid crystal alignment film is any one of polystyrene and derivatives thereof, polyvinyl alcohol, polyester, epoxy resin, polyurethane, polysilane and polyimide.

12. The display device according to claim 1, wherein the transparent film layer are arranged on the substrate and spaced apart; and
each of the containing grooves is defined between two of the spaced apart transparent film layer on the substrate.

13. The display device according to claim 12, wherein the liquid crystal molecules and the liquid crystal alignment film are located between the two of the spaced apart transparent film layer on the substrate, and located between the substrate and the packaging substrate.

14. The display device according to claim 3, wherein when light emitted from one of the plurality of pixels located in a position corresponding to one of the containing grooves, polarization state of the light is changed from original polarization state of the light; and
when light emitted from one of the plurality of pixels located in a position corresponding to the transparent film layer, polarization state of the light is maintained original polarization state of the light.

15. The display device according to claim 3, length and wide of each of the containing grooves is identical to length and width of one column of the plurality of pixels; or the length and the wide of each of the containing grooves is identical to length and width of one row of the plurality of pixels.

16. The manufacturing method according to claim 4, wherein the transparent film layer are arranged on the substrate and spaced apart; and
each of the containing grooves is defined between two of the spaced apart transparent film layer on the substrate.

17. The manufacturing method according to claim 16, wherein the liquid crystal molecules and the liquid crystal alignment film are located between the two of the spaced apart transparent film layer on the substrate, and located between the substrate and the packaging substrate.

18. The liquid crystal display grating according to claim 8, wherein the transparent film layer are arranged on the substrate and spaced apart; and each of the containing grooves is defined between two of the spaced apart transparent film layer on the substrate.

19. The liquid crystal display grating according to claim 18, wherein the liquid crystal molecules and the liquid crystal alignment film are located between the two of the spaced apart transparent film layer on the substrate, and located between the substrate and the packaging substrate.

20. The display device according to claim 1, wherein the liquid crystal alignment film is only arranged between two adjacent of the plurality of islands and is not arranged on the transparent film layer; the liquid crystal alignment film is only arranged on the substrate; and a surface of one of the plurality of islands away from the liquid crystal alignment film only directly contacts the packaging substrate.

* * * * *